Figure 1:
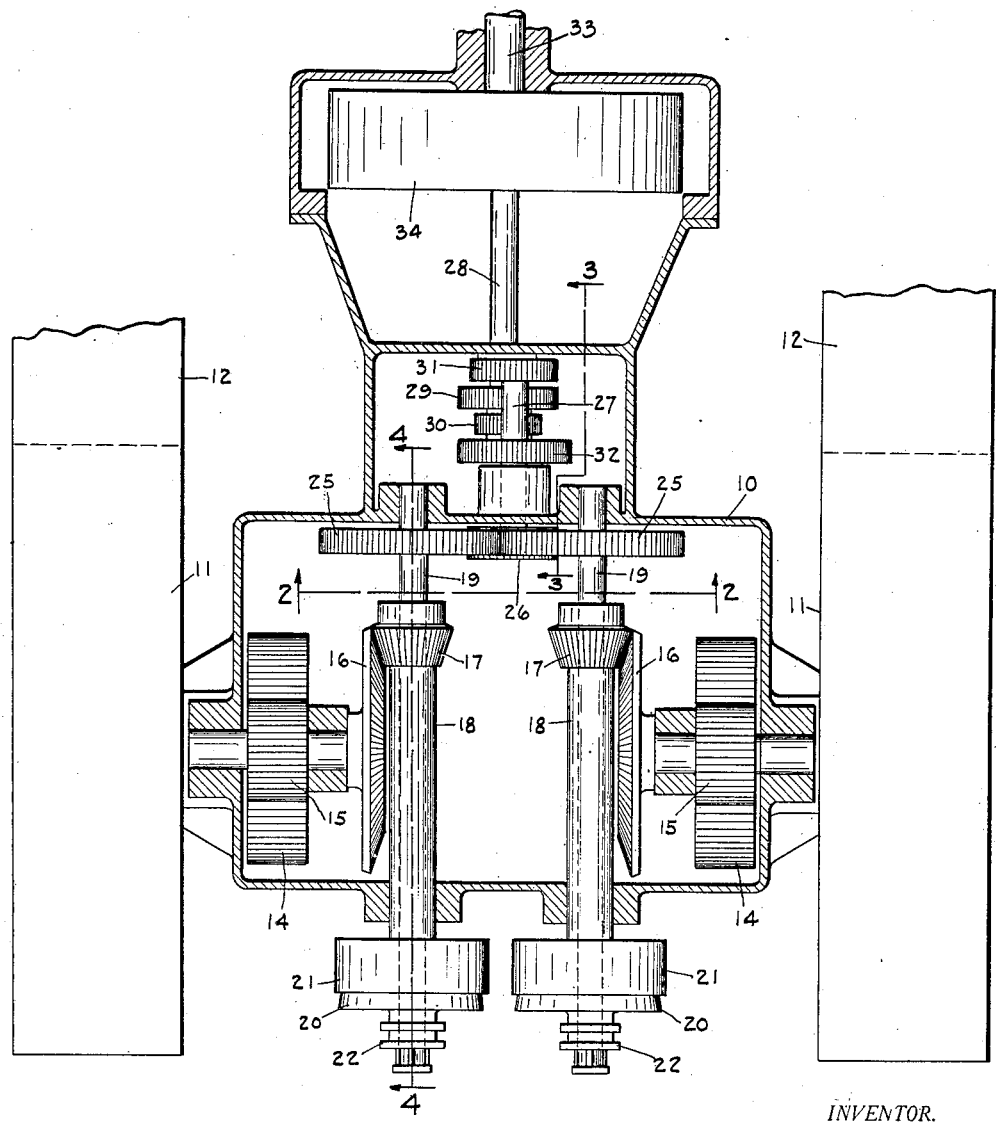

J. W. LAMBERT.
TRACTOR.
APPLICATION FILED APR. 21, 1919.

1,372,756.

Patented Mar. 29, 1921.
2 SHEETS—SHEET 1.

INVENTOR.
JOHN W. LAMBERT.
BY
ATTORNEYS

J. W. LAMBERT.
TRACTOR.
APPLICATION FILED APR. 21, 1919.
1,372,756.
Patented Mar. 29, 1921.
2 SHEETS—SHEET 2.
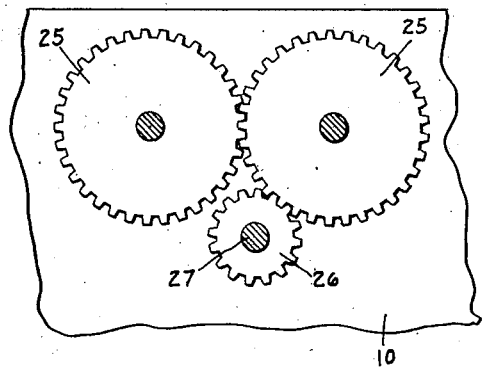
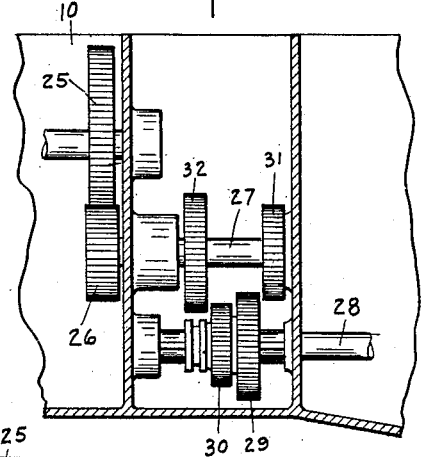
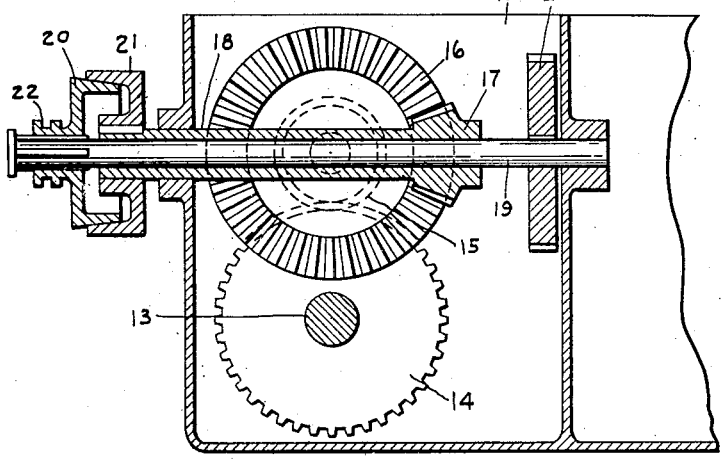
INVENTOR.
JOHN W. LAMBERT
BY
ATTORNEYS

UNITED STATES PATENT OFFICE.

JOHN W. LAMBERT, OF ANDERSON, INDIANA.

TRACTOR.

1,372,756.  Specification of Letters Patent.  Patented Mar. 29, 1921.

Application filed April 21, 1919. Serial No. 291,423.

*To all whom it may concern:*

Be it known that I, JOHN W. LAMBERT, a citizen of the United States, and a resident of Anderson, county of Madison, and State of Indiana, have invented a certain new and useful Tractor; and I do hereby declare that the following is a full, clear, and exact description thereof, reference being had to the accompanying drawings, in which like numerals refer to like parts.

The object of this invention is to provide a strong, compact and satisfactory construction or power transmission mechanism for propelling tractors, particularly of the caterpillar or chain tread type.

One feature of the invention consists in providing a transmission for propelling the tractor, which includes a pair of shafts for propelling the side wheels of the tractor, with meshing gears secured to said two shafts and a gear for driving one of said pair of gears driven by gears on a driving shaft or engine shaft located centrally of said pair of gears, whereby the side wheels of the tractor will be driven in the same direction and enable the driving pinions on the pair of shafts to be located near their driven ends.

The full nature of this invention will be understood from the accompanying drawings and the following description and claims.

In the drawings Figure 1 is a horizontal section through a portion of the tractor, parts being shown in plan view and other parts being broken away. Fig. 2 is a vertical section on the line 2—2 of Fig. 1. Fig. 3 is a section on line 3—3 of Fig. 1. Fig. 4 is a vertical section on the line 4—4 of Fig. 1.

Only that portion of the tractor relating to the novel transmission mechanism is included herein, as the remaining portion is well known to those skilled in the art.

As shown herein a main frame 10 is propelled by two side wheels 11 that travel on a chain tread 12. The two wheels 11 have axles 13, which are in alinement with each other and each carries a gear 14 that meshes with a pinion 15 driven by a bevel gear 16. The two beveled gears 16 face each other and each is driven by a bevel pinion 17, which is secured on the sleeve 18 loosely mounted on a shaft 19, extending longitudinally of the tractor. The two shafts 19 are parallel with each other and at their rear ends are coupled with sleeves 18 by the friction clutch member 20 on the shaft and the friction clutch member 21 on the sleeve. A suitable lever mechanism, not shown, engages the collar 22 for moving the clutch member 20 into and out of clutching position. This makes a friction clutch peculiarly well adapted for a machine of this type.

On the front ends of the two shafts 19 there are mounted a pair of gears 25 similar in diameter and meshing with each other. One of these gears 25 receives power from a pinion 26, secured on a counter-shaft 27, which is driven from the driving shaft 28 from the engine through the change-speed gears 29 and 30, which are splined on the driving shaft. These gears may be moved into driving engagement with either of the gears 31 or 32 on shaft 27 or into idle position between them, as shown in Fig. 3. The driving shaft 28 is connected with the engine shaft 33, which carries a fly wheel 34.

It is seen that the shaft 27 is offset to one side of the center line between the two gears 25 (see Fig. 2) so that the gear 26 will mesh with only one of the gears 25 and drive them in opposite directions, which enables the bevel gears 17 to be located near the driving ends of the shafts 19 and yet propel the side wheels of the tractor in the same direction.

With the individual clutch mechanism for each shaft 19 and sleeve 18, it will be understood that either axle 13 may be disconnected from the driving mechanism, whereby the tractor will be turned by applying power to the other axle.

The invention claimed is:

1. A tractor having a propelling wheel on each side thereof, the axles thereof being in alinement with each other, a gear for driving the axle of each propelling wheel, a pair of sleeves rotatable with and supporting said gears, a pair of shafts extending through said sleeves and rotatably mounting the same, gear means on each shaft for simultaneously driving the same, and friction means on each of said shafts for clutching each sleeve to each shaft for driving the sleeve.

2. A tractor having a propelling wheel on each side thereof, the axles thereof being in alinement with each other, a gear for driving the axle of each propelling wheel, a pair of sleeves rotatable with said gears, a pair of shafts extending through said sleeves and rotatably mounting the same, friction means at one end of said shaft for clutching each sleeve to each shaft, a pair of gears on the opposite ends of said shafts which mesh with each other, and means for driving said last mentioned pair of gears.

3. A tractor having a propelling wheel on each side thereof, the axles thereof being in alinement with each other, a gear for driving the axle of each propelling wheel, a pair of sleeves rotatable with said gears, a pair of shafts extending through said sleeves and rotatably mounting the same, friction means on each of said shafts for clutching each sleeve to each shaft for driving the sleeve, a pair of gears, one on each of said shafts, a second shaft, gear means at one end thereof for driving said last mentioned pair of gears, an engine shaft, a plurality of change-speed gears on the opposite end of said second mentioned shaft, and a plurality of change-speed gears on said engine shaft coöperating with the before mentioned change-speed gears for transmitting power to said axles.

In witness whereof I have hereunto affixed my signature.

JOHN W. LAMBERT.